US010766437B2

United States Patent
Herrmann et al.

(10) Patent No.: US 10,766,437 B2
(45) Date of Patent: Sep. 8, 2020

(54) ELECTRIC VEHICLE SAFETY SYSTEM AND METHODS

(71) Applicants: VOLKSWAGEN AG, Wolfsburg (DE); AUDI AG, Ingolstadt (DE); PORSCHE AG, Stuttgart (DE)

(72) Inventors: Mirko Herrmann, Mountain View, CA (US); Angela-Kristina Speidel, Mountain View, CA (US)

(73) Assignees: Volkswagen AG, Wolfsburg (DE); Audi AG, Ingolstadt (DE); Porsche AG, Stuttgart (DE)

( * ) Notice: Subject to any disclaimer, the term of this patent is extended or adjusted under 35 U.S.C. 154(b) by 221 days.

(21) Appl. No.: 15/841,576

(22) Filed: Dec. 14, 2017

(65) Prior Publication Data

US 2019/0184915 A1    Jun. 20, 2019

(51) Int. Cl.
```
B60R 16/02    (2006.01)
H02K 9/00     (2006.01)
H02H 7/08     (2006.01)
H02H 6/00     (2006.01)
B60L 3/00     (2019.01)
B60L 58/26    (2019.01)
B60L 50/64    (2019.01)
```

(52) U.S. Cl.
CPC ............ B60R 16/02 (2013.01); B60L 3/0007 (2013.01); B60L 3/0046 (2013.01); B60L 50/64 (2019.02); B60L 58/26 (2019.02); H02H 6/00 (2013.01); H02H 7/08 (2013.01); H02K 9/005 (2013.01)

(58) Field of Classification Search
CPC . H02H 6/00; H02H 7/08; H02K 9/005; B60R 6/02

USPC ............................................................ 361/23
See application file for complete search history.

(56) References Cited

U.S. PATENT DOCUMENTS

| | | | |
|---|---|---|---|
| 8,739,406 B2* | 6/2014 | Campbell | B23P 15/26 29/890.07 |
| 8,862,414 B2 | 10/2014 | LePort et al. | |
| 8,920,955 B1* | 12/2014 | Chuang | H01M 2/1077 429/7 |
| 9,668,376 B2* | 5/2017 | Riedel | H02M 7/003 |
| 10,062,877 B2* | 8/2018 | Lee | H01M 2/1022 |
| 10,103,414 B2* | 10/2018 | Mastrandrea | B60L 50/50 |
| 10,183,550 B2* | 1/2019 | Gebbie | B60H 1/00921 |
| 2008/0265586 A1* | 10/2008 | Like | H05K 7/20854 290/38 R |

(Continued)

FOREIGN PATENT DOCUMENTS

| | | |
|---|---|---|
| DE | 3201758 A1 | 9/1983 |
| DE | 102008059948 A1 | 6/2010 |

(Continued)

*Primary Examiner* — Jorge L Carrasquillo
*Assistant Examiner* — Devon A Joseph
(74) *Attorney, Agent, or Firm* — Barnes & Thornburg LLP

(57) ABSTRACT

Systems, components, and methodologies are provided for improvements in operation of automotive vehicles by enabling monitoring analysis and reaction to subtle sources of information that aid in prediction and response of vehicle control systems across a range of automation levels. Such systems, components, and methodologies include wheel-turn detection equipment for detecting a wheel angle of another vehicle to trigger a vehicle control system to perform an operation based on the detected wheel angle of the other vehicle.

18 Claims, 10 Drawing Sheets

(56) References Cited

U.S. PATENT DOCUMENTS

| | | | |
|---|---|---|---|
| 2008/0292950 A1 | 11/2008 | Maeda et al. | |
| 2009/0274952 A1* | 11/2009 | Wood | H01M 2/1205 429/99 |
| 2010/0078182 A1 | 4/2010 | Alkemade et al. | |
| 2010/0136420 A1* | 6/2010 | Shin | H01M 2/206 429/178 |
| 2012/0111444 A1* | 5/2012 | Hermann | H01M 10/613 141/1.1 |
| 2013/0073229 A1* | 3/2013 | Leport | H01M 2/348 702/58 |
| 2013/0122339 A1* | 5/2013 | Chae | B60L 50/64 429/99 |
| 2013/0136974 A1* | 5/2013 | Lim | H01M 2/34 429/157 |
| 2014/0102731 A1 | 4/2014 | Riegger et al. | |
| 2014/0356671 A1* | 12/2014 | Dawley | H01M 10/482 429/90 |
| 2015/0330768 A1* | 11/2015 | Sieg | G01B 7/14 324/658 |
| 2016/0009386 A1 | 1/2016 | Trull et al. | |
| 2016/0133890 A1* | 5/2016 | Lee | H01M 10/613 429/72 |

FOREIGN PATENT DOCUMENTS

| | | | | |
|---|---|---|---|---|
| DE | 102013206191 A1 | 10/2014 | | |
| EP | 2851973 A1 * | 3/2015 | | H01M 10/6567 |
| WO | 2014095223 A1 | 6/2014 | | |

\* cited by examiner

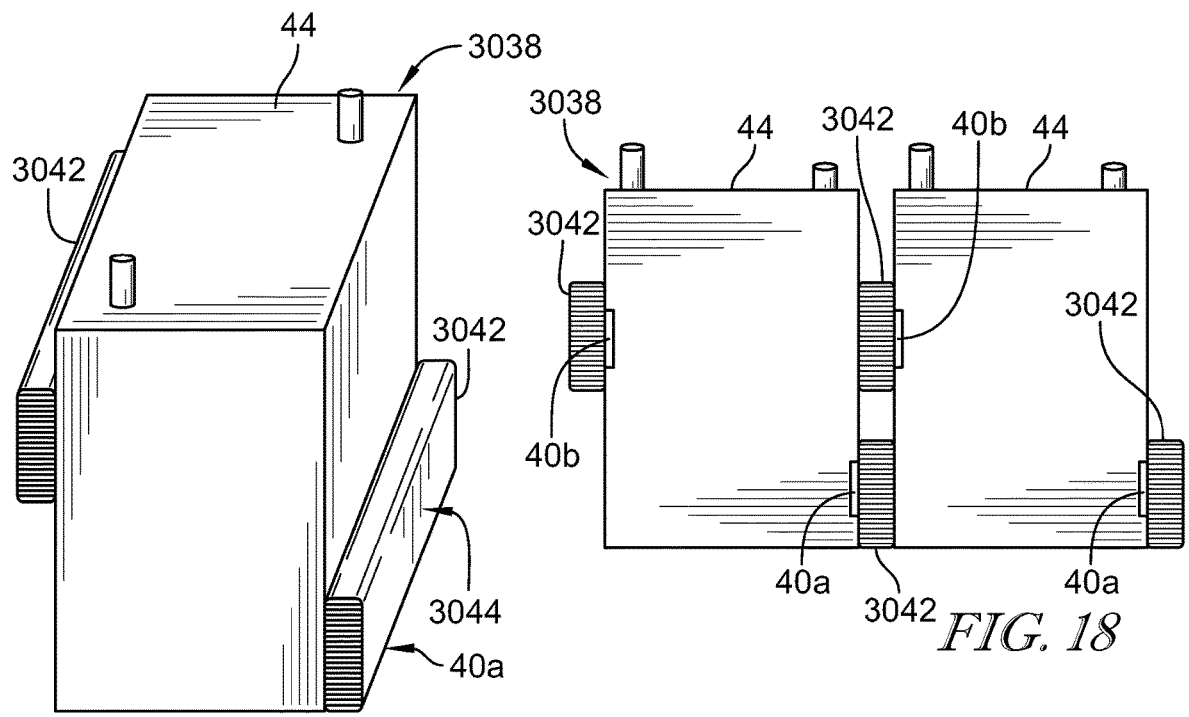
FIG. 17
FIG. 18
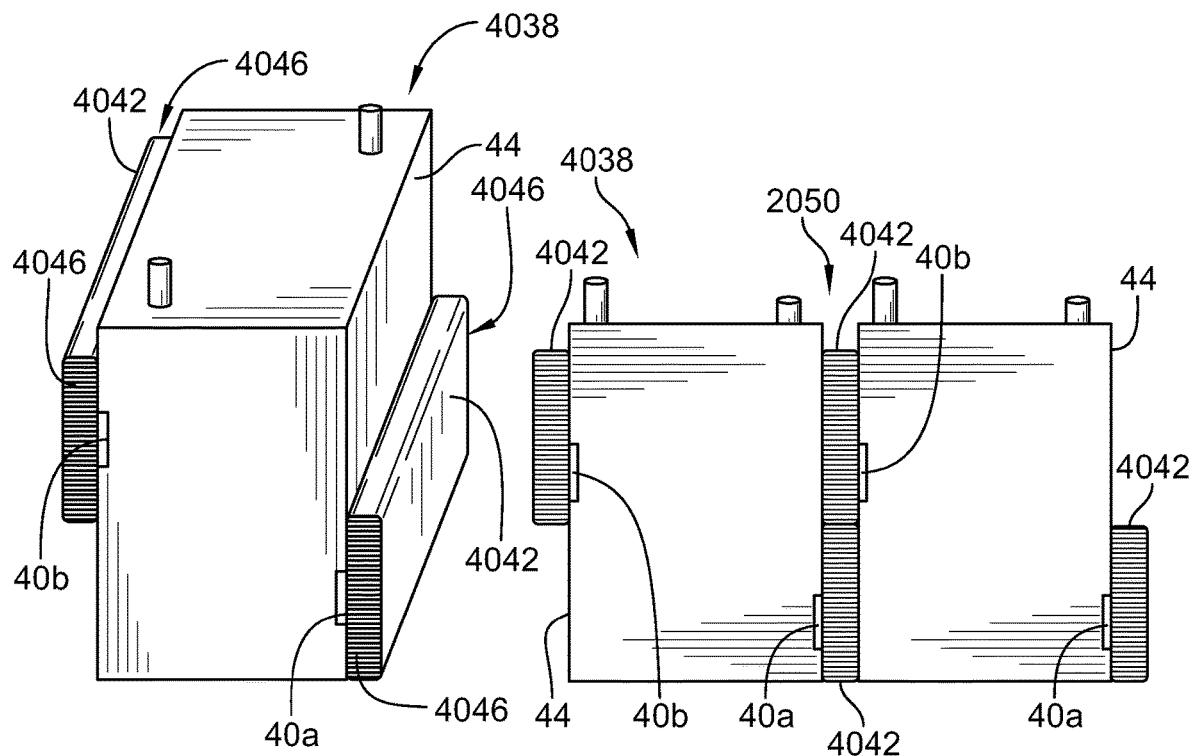
FIG. 19
FIG. 20

ELECTRIC VEHICLE SAFETY SYSTEM AND METHODS

FIELD

The present disclosure relates to systems, components, and methodologies for electric vehicles. More particularly, the present disclosure relates to systems, components, and methodologies for safety in interaction with electric vehicles.

BACKGROUND

Electric vehicles, which may utilize at least partial electric motive power, can present new challenges in practical use. Safety considerations which may be common to purely combustion powered vehicles may not address all practical concerns for electric vehicles. For example, high voltage sources can be present in electric vehicles. The functional design of electric vehicles can enhance the safety of electrical systems by addressing such practical concerns. The safety of occupants, technicians, and rescue workers can be improved by practical design considering issues relevant to electric vehicles.

SUMMARY

Accordingly, consideration of sources of hazard in electric vehicles can improve the safety of occupants, technicians, and rescue workers. According to the present disclosure, systems, components, and methodologies are provided for improvements in safety of electric vehicles.

Disclosed embodiments provide an electrical vehicle for operation on roadways, that includes an electric power control means connected to a drive train to control provision of motive power, and configured to achieve electrical connection for shorting in response to insertion of safety enhancement fluid into the electric power system to short and/or cool the system in the event of an emergency to reduce hazards to vehicle occupants, rescue and/or service personnel.

In accordance with at least one embodiment, the electric power control means includes a tray defining a cavity, a power pack arranged within the cavity and having a pair of main terminals of opposite polarity, at least two power cells electrically connected in series, and a plurality of auxiliary terminals connected to the at least two power cells and arranged in fluid communication with each other within the tray to achieve the electrical connection for shorting as a result of at least partial filling of the tray with a safety enhancement substance.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 17 is a perspective view of another embodiment of the battery pack unit of FIG. 15 including upper and lower channels arranged on opposite sides of the housing of the battery pack unit;

FIG. 18 is an elevation view of the battery pack unit of FIG. 17 arranged together with an adjacent and complimentary battery pack unit having corresponding upper and lower channels;

FIG. 19 is a perspective view of another embodiment of the battery pack unit of FIG. 17 including upper and lower channels arranged on opposite sides of the housing of the battery pack unit having increased contact area with the housing to promote heat transfer;

FIG. 20 is an elevation view of the battery pack unit of FIG. 19 including upper and lower channels arranged on opposite sides of the housing of the battery pack unit having increased contact area with the housing to promote heat transfer;

DETAILED DESCRIPTION OF THE DISCLOSED EMBODIMENTS

Automotive vehicles for operation on roadways can have a variety of propulsion types, among which electric power is becoming more common, whether partial (e.g., hybrid) or fully (e.g., fuel cell, plug-in) electrically propelled. Electric power for propelling vehicles can present challenges, such as challenges in handling high voltage power generation and/or storage. For example, electric vehicles may include high voltage sources such as batteries and/or generators. High voltages batteries in such vehicle applications are often serially connected to provide increased voltage.

If damaged or malfunctioning, for example, due to a traffic collision, such batteries can present unpredictable fire hazard. Moreover, damaged or malfunctioning high voltage batteries can present an unseen voltage hazard to occupants, technicians, and/or rescue responders. As discussed in additional detail herein, short circuiting the serial connections of electric vehicle power sources can provide a quick and effective approach for mitigating voltage hazards. Furthermore, cooling damaged or malfunctioning power sources can reduce the risk of battery fires and/or explosions.

Figure 1:
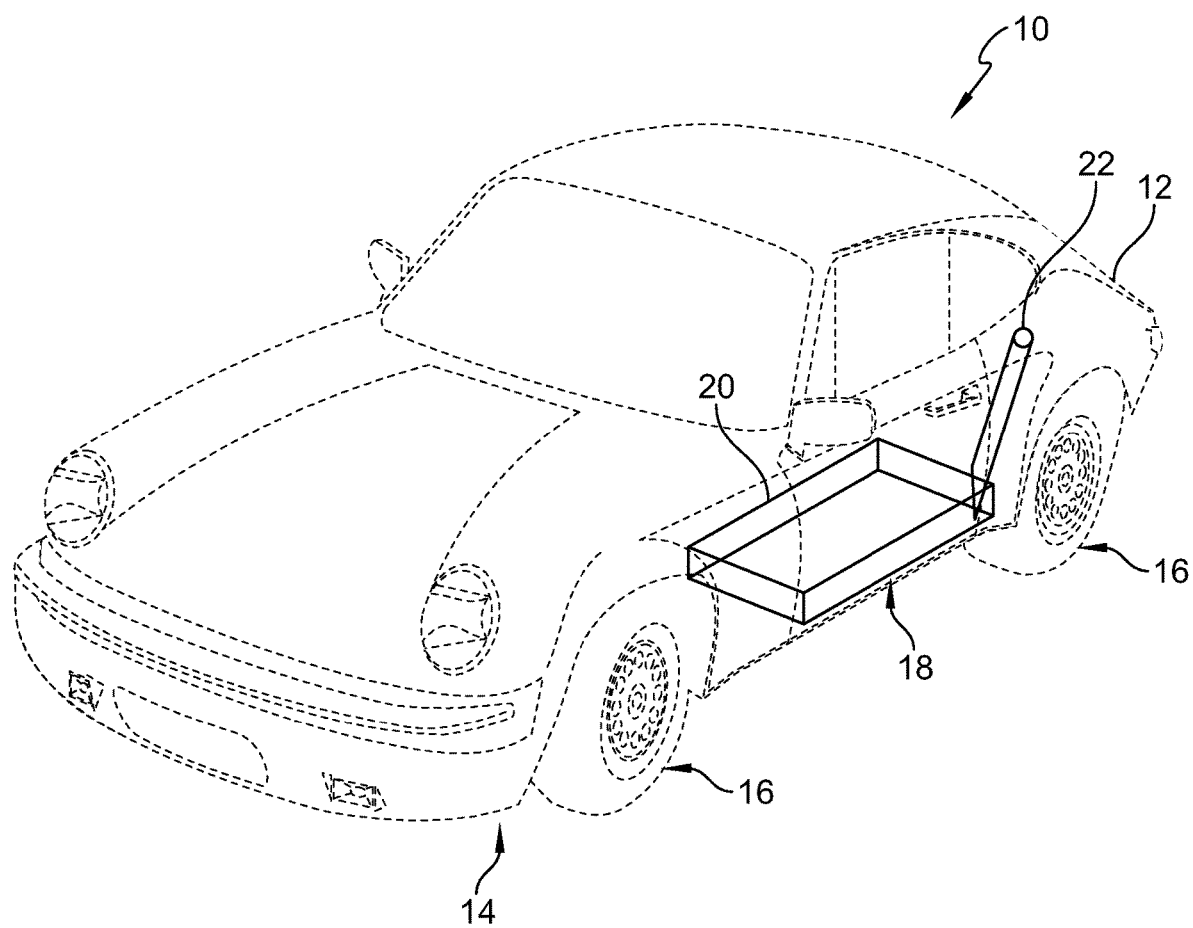
FIG. 1 is a perspective view of a vehicle for operation on roadways showing that the vehicle has a chassis including wheels and showing that the vehicle includes a high voltage electric power system or means for controlling provision of power to provide drive to the wheels, and showing that the vehicle includes a port accessible on the exterior for receiving safety enhancement fluid into the electric power system to short and/or cool the system in the event of an emergency to reduce hazards to vehicle occupants, rescue and/or service personnel.

In the illustrative embodiment as shown in FIG. 1, a vehicle 10 is arranged for electric motive power for propulsion on roadways. The vehicle 10 includes a vehicle body 12 and chassis 14 which forms a vehicle base. The chassis 14 includes wheels 16 which can be driven by a power system 18 to provide motive power for propelling the vehicle 10. In the illustrative embodiment, the power system 18 is an electrical power system including a compartment 20 for housing an electrical power source.

In the illustrative embodiment, the compartment 20 is a tray for housing a chemical energy storage device as the electrical power source, embodied as a battery. The tray 20 may be connected to a port 22 for receiving an inflow of safety enhancement substance for cooling and/or short circuiting the battery. The port 22 may be disposed on the exterior of the body 12 for access, for example, by service and/or rescue personnel to inject the substance into the tray 20. The safety enhancement substance may be water but may include any suitable substance for cooling and/or short circuiting the power source as discussed in additional detail herein. Acceptable substances may include conductive and/or cooling materials such as fluids, foams, powders, and/or other materials forms.

Figure 2:
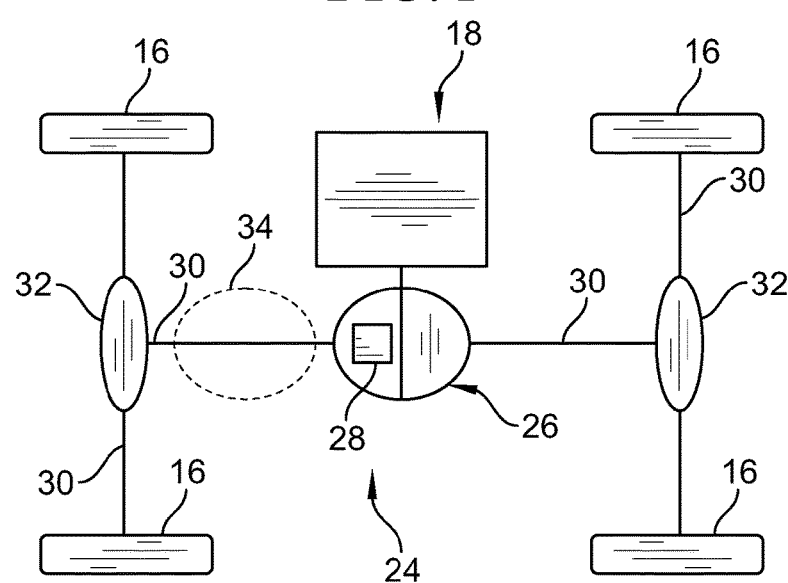
FIG. 2 is a diagrammatic overhead view of the vehicle of FIG. 1 showing that the vehicle includes a power train which is connected to chassis and the electric power system to transmit power to the wheels.

As shown in FIG. 2, the power system 18 may be connected to a power train 24 to provide motive force to the wheels 16. The power train 24 may include an electric motor 26 connected to the power system 18 to receive electrical power for conversion to mechanical rotation. The power train 24 may include a transmission 28, drive members 30, and transfer devices 32 to provide rotational force to the wheels 16. The power train 24 may optionally include another power mechanism 34, for example, a combustion engine and/or fuel cell arranged to provide motive force and/or electrical power in combination with the power system 18, for example, as a hybrid vehicle. In the illustrative embodiment of FIG. 2, the power train 24 is arranged to provide rotation to each of the four wheels 16, but in some embodiments may be arranged to drive less than all of the wheels 16.

Figure 3:
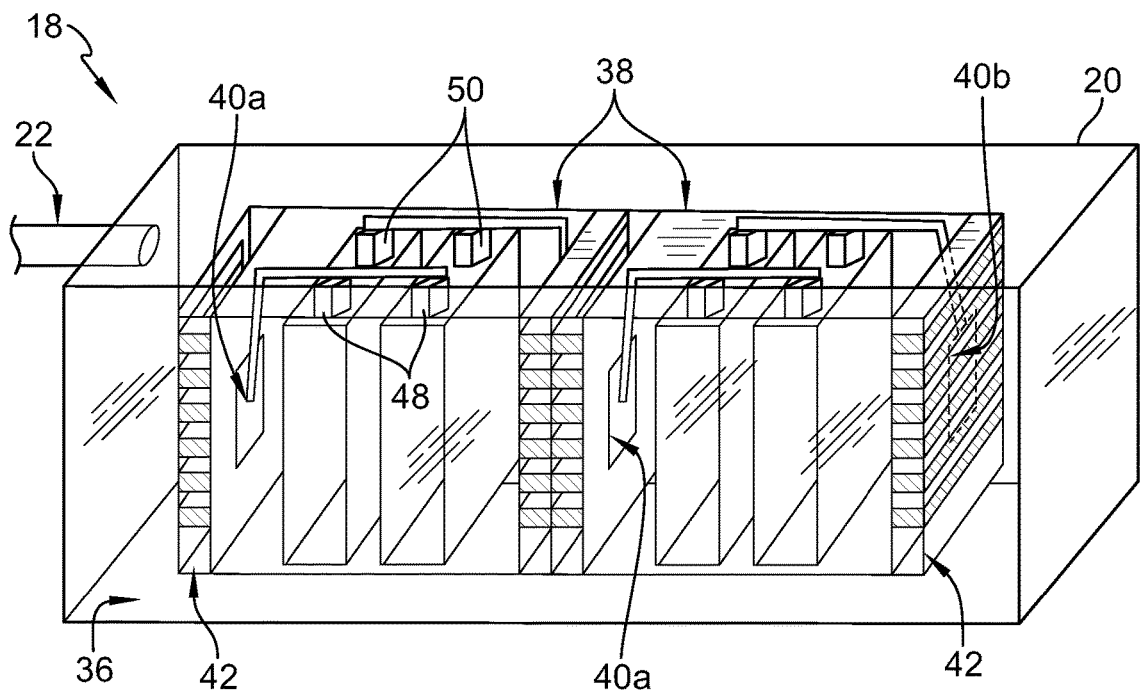
FIG. 3 is a perspective view of a tray of the electric power system of the vehicle of FIGS. 1 and 2 showing that the tray defines a cavity which contains two battery pack units each having housing and a pair of power cells that are electrically connected in series and arranged within the housing, and showing that auxiliary terminals are positioned on the pack housing of each battery pack unit with a cover arranged to shield the auxiliary terminals while permitting safety enhancement fluid that is injected into the tray to ingress into the cover to contact the auxiliary terminals to create a local electrical short.

Referring to FIG. 3, an illustrative power system 18 is shown including the tray 20. The tray 20 may define a cavity 36 therein containing the power source, embodied as a two battery packs 38, although in some embodiments any suitable number of power packs may be applied. The battery packs 38 may be electrically connected in series to provide high voltage power. The battery packs 38 each include auxiliary terminals 40a, 40b electrically connected to power cells of the battery packs 38. The auxiliary terminals 40a, 40b are disposed to receive contact with the safety enhancement substance with at least partial filling of the tray 20 with the safety enhancement substance. The auxiliary terminals 40a, 40b may each be shielded with a cover 42 arranged to impeded contact by foreign objects (e.g., a user's hand) but permitting ingress of the safety enhancement substance.

Figure 4:
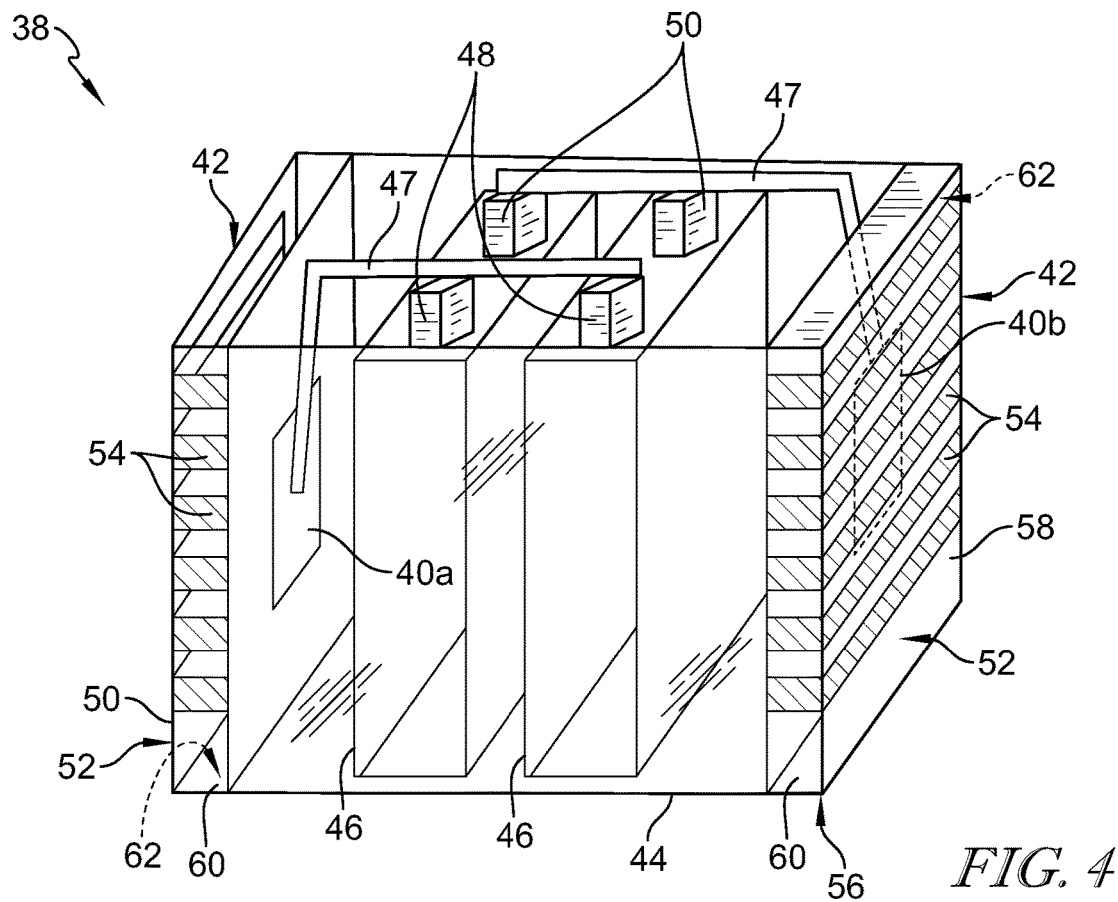
FIG. 4 is a perspective view of one battery pack unit within the tray of FIG. 3 showing that auxiliary terminals are disposed on opposite ends of the pack housing each having a cover arranged for shielding.

A single battery pack 38 is shown in isolation in FIG. 4 having covers 42 arranged for shielding. The battery pack 38 may include a housing 44 containing a number of power cells 46 electrically connected in series. The power cells 46 may include main terminals 48, 50 for serial connection. The auxiliary terminals 40a, 40b may be electrically connected to the main terminals 48, 50 of the power cells 46 to provide selective short circuiting of their serial voltage output under contact with the safety enhancement substance. In the illustrative embodiment, the auxiliary terminals 40a are connected by wiring 47 with the main terminals 48 having common polarity (e.g., negative) and the auxiliary terminals 40b are connected by wiring 47 with the main terminals 50 having common polarity (e.g., positive).

The covers 42 may each include a cover body 52 and inlets 54 allowing ingress of the substance. The cover body 52 may comprise a support structure 56 having outer walls 58,60 and defining an inner space 62, and inlets 54 defined through the outer walls 58,60 to allow the safety enhancement substance to flow into the inner space 62. The auxiliary terminals 40a, 40b may be arranged within and/or in communication with the inner space 62 of the respective cover 42 for contact with the substance therein. The inlets 54 may be formed as openings having a mesh or grid disposed thereon to block against objects entering the inner space 62, but allowing ingress of the safety enhancement substance.

Figure 5:
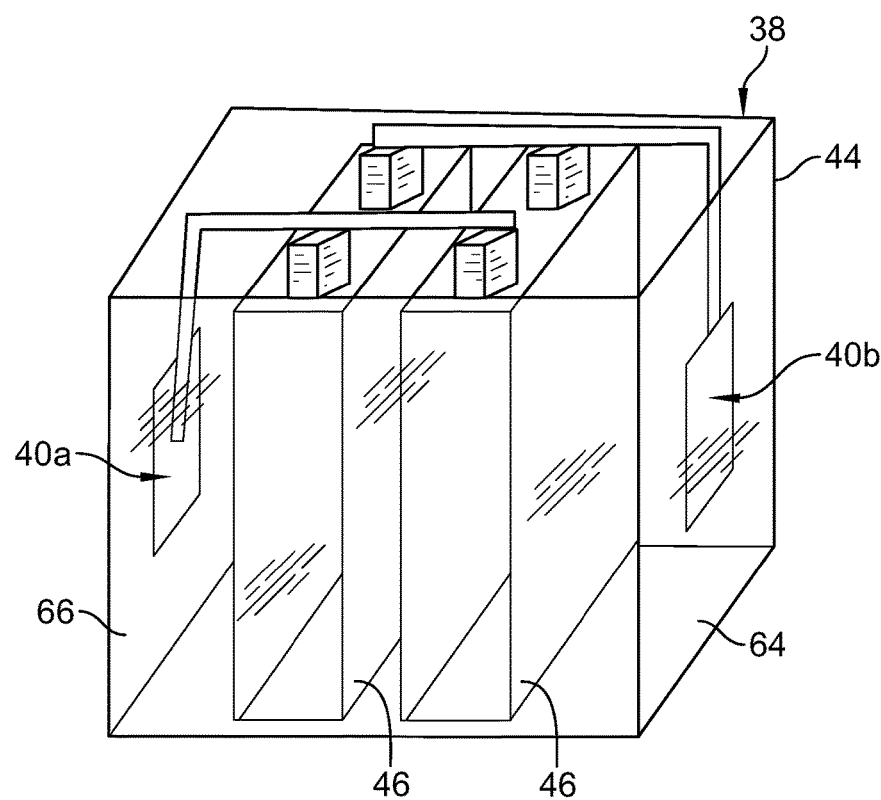
FIG. 5 a perspective view of the battery pack unit of FIG. 4 with the covers omitted to show that one plurality of auxiliary terminals (left) is electrically connected to positive main terminals of the power cells and another plurality of auxiliary terminals (right) is electrically connected to negative terminals of the power cells.
Figure 6:
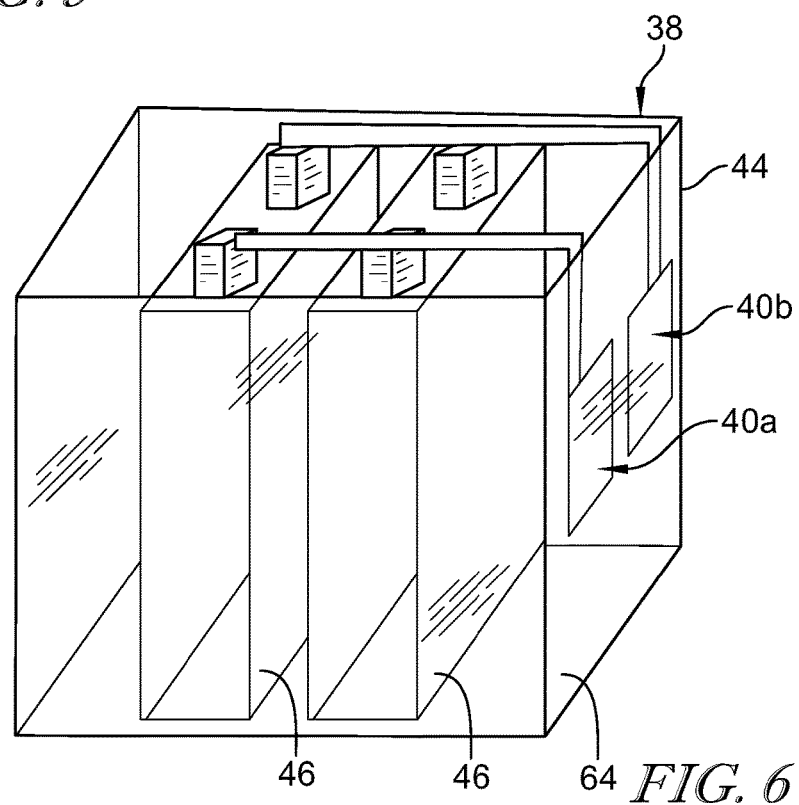
FIG. 6 is a perspective view another embodiment of the battery pack unit of FIG. 4 with the covers omitted to show that the pluralitys of auxiliary terminals are positioned on same side of the housing.

Referring to FIG. 5, the battery pack 38 is shown with the covers 42 removed to illustrate the arrangement of the auxiliary terminals 40a, 40b. The auxiliary terminals 40a, 40b may be arranged on outer sides 64, 66 of the housing 44. In the illustrative embodiment, the auxiliary terminals 40a, 40b may have opposite polarity and may be arranged on outer sides of the housing 44 opposite one another. As shown in the embodiment of FIG. 6, the auxiliary terminals 40a, 40b may be arranged on the same outer side 64 of the housing. The spatial arrangement of the auxiliary terminals 40a, 40b from each other (and more specifically, the resistance of the short circuit connection provided by the safety enhancement substance) can produce different effects when short circuited on contact with the safety enhancement substance as explained in additional detail herein.

Figure 7:
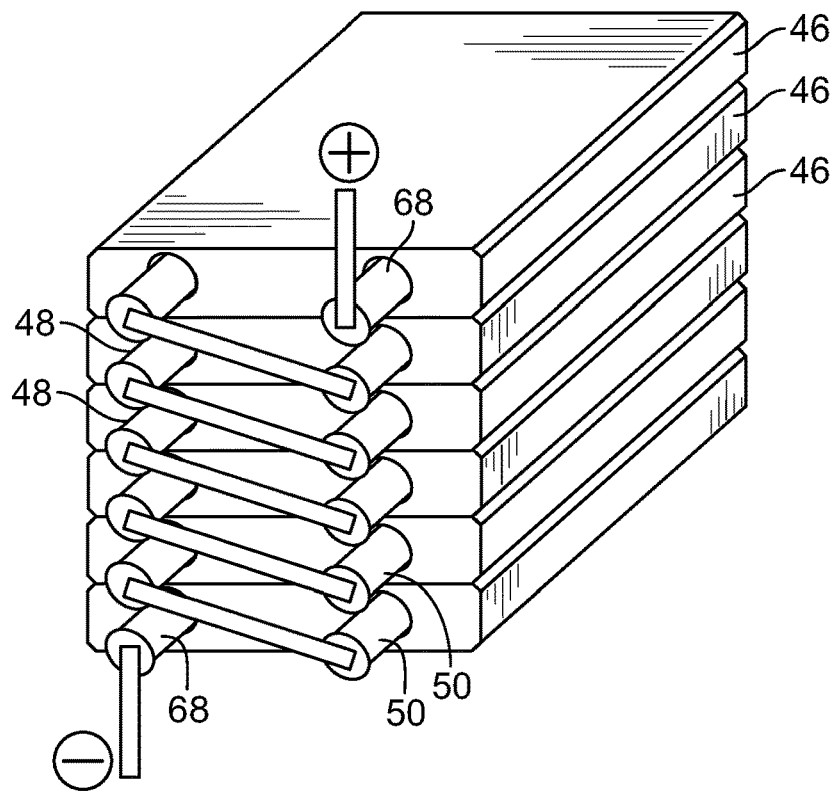
FIG. 7 is a detailed sideways perspective view of a number of power cells of the battery pack unit of FIG. 4 with the pack housing omitted to show that the power cells are electrically connected in series by main terminals of each power cell and include connection main terminals which are available for connection to other devices.

Referring to FIG. 7, the battery pack 38 is shown within the housing 44 omitted to reveal an exemplary set of power cells 46 (sideways). Each power cell 46 may include negative and positive main terminals 48, 50 connected in series with adjacent power cells 46. The endmost cells (top and bottom) each include a connection main terminal 68 which remains available for connection with other battery packs 38 or components, the connection main terminals 68 being opposite polarity to provide a total voltage differential.

Figure 8:
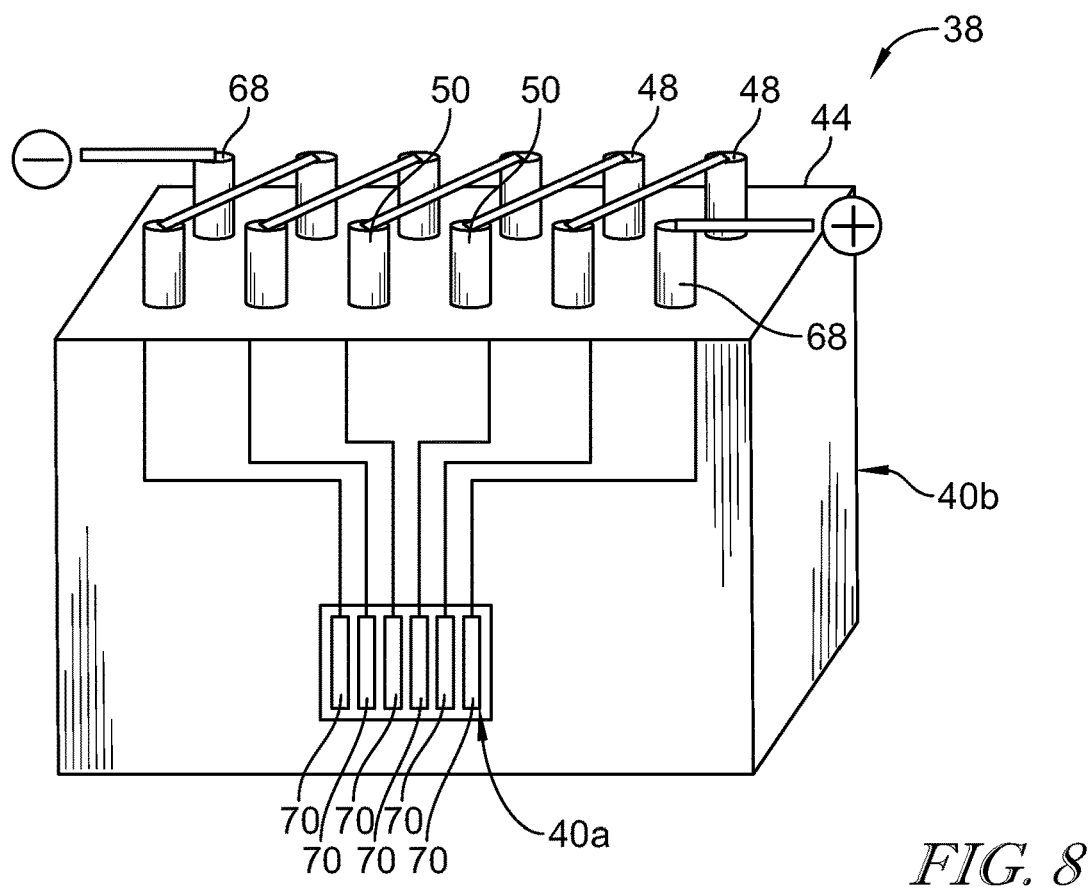
FIG. 8 is a detailed perspective view of the battery pack unit of FIG. 4 including the pack housing and showing that the main terminals of each power cell protrude from the pack housing and showing that each auxiliary terminal of the plurality is electrically connected to a respective power cell on the positive polarity side, and namely with the positive main terminal of the respective power cell.

As shown in FIG. 8, the battery pack 38 has the housing 44 in place and includes the main terminals 48, 50 exposed on top. The auxiliary terminals 40a, 40b (auxiliary terminals 40b being arranged on a rear side in the orientation of FIG. 8) may be electrically connected to the respective main terminals 48, 50. Each of the auxiliary terminals 40a, 40b may include terminal ends 70 electrically connected to the main terminals 48, 50 of one of the power cells 46. Each terminal end 70 may be connected to one main terminal of one of the power cells 46. The terminal ends 70 of the auxiliary terminals 40a may have common polarity with each other (e.g., positive) while the terminal ends 70 of the auxiliary terminals 40a may have common polarity with each other (e.g., negative) and opposite polarity with those of auxiliary terminals 40a.

In some embodiments, a single set of auxiliary terminals 40a or 40b may be applied having common polarity such that short circuiting may be achieved only across terminal ends 70 of common polarity. Although short circuiting across different polarities can provide quick and maximum voltage reduction, shorting only the common polarities can provide effective voltage reduction while reducing formation of gases, such as hydrogen and oxygen. In some embodiments, one or more sets of auxiliary terminals 40a, 40b may be applied having adjacent terminal ends 70 of opposite polarity to provide the fastest shorting of the battery.

Figure 9:
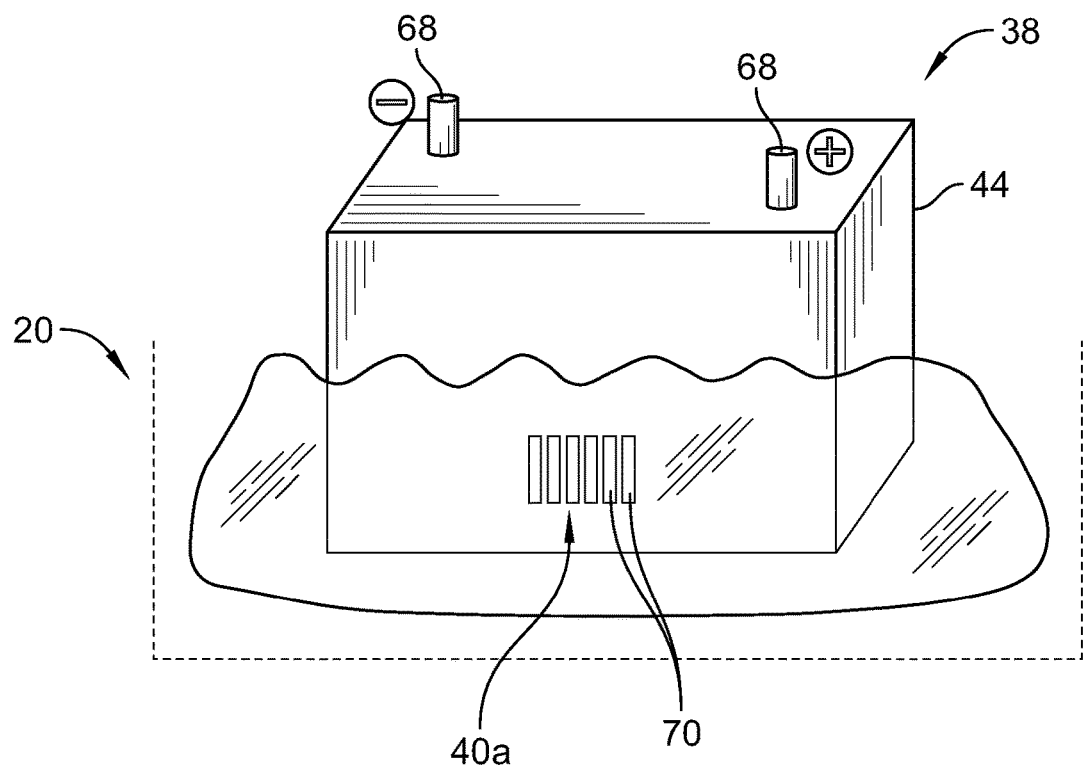
FIG. 9 is a perspective view of the battery pack unit of FIG. 8 having only the connection main terminals exposed through the pack housing and pictorially representing a level of safety enhancement substance, such as water, which forms an electrical connection between the auxiliary terminals of the plurality of auxiliary terminals to create a local short.

As shown in FIG. 9, the battery pack 38 is shown having safety enhancement substance, embodied as water, at least partially filling the tray 20. The water can contact the terminal ends 70 of the auxiliary terminals 40a, 40b and provides a short circuit connection reducing the voltage output. In embodiments in which only auxiliary terminals of common polarity are provided, a similar short circuit is formed but the auxiliary terminals 40b (rear side) can be omitted. The safety enhancement substance may additionally or alternatively provide cooling to the power system 18 to reduce hazards of damage and/or malfunctioning units.

Figure 10:
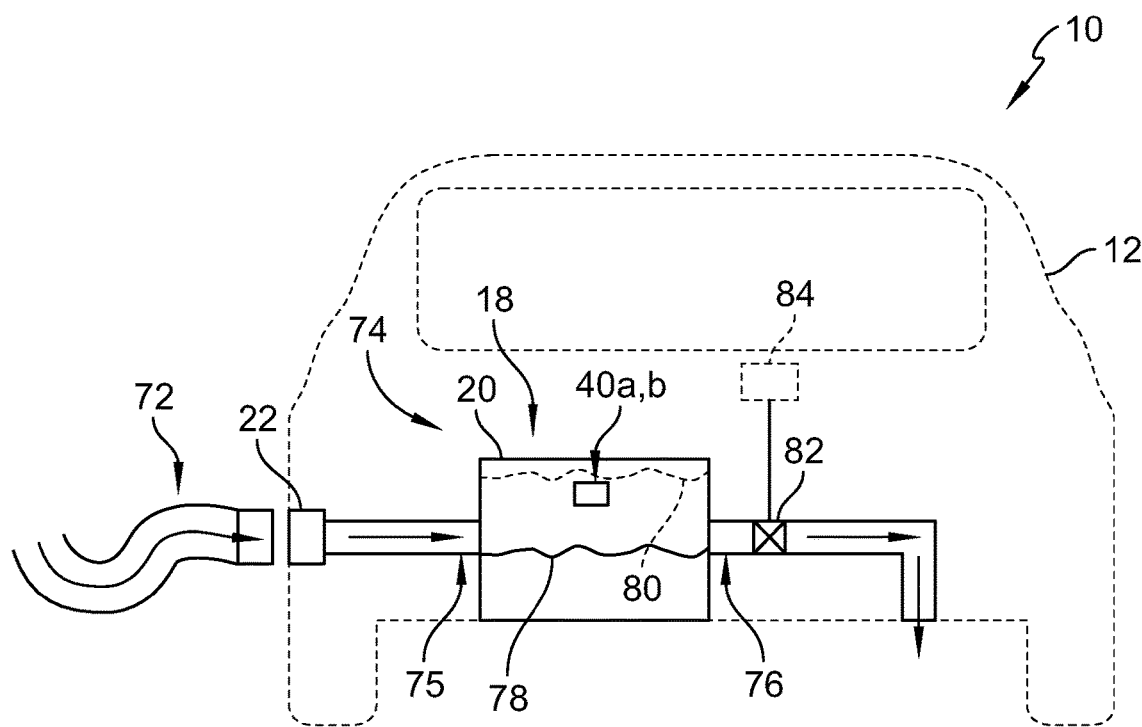
FIG. 10 is a diagrammatic view of the electric power system of the vehicle of FIG. 1 showing a flow control system for regulating the flow of safety within the tray and showing that the flow control system includes a flow control means for governing the flow rate of safety enhancement substance through the tray.

Referring now to FIG. 10, the vehicle 10 may be disabled and a concern for battery hazards exists. Accordingly, a supply 72 of safety enhancement substance can be connected to the port 22 to provide the substance to the tray 20. A flow control system 74 may include an inlet 75 of the tray 20 arranged for receiving substance from the port 22. The flow control system 74 may include an outlet 76 of the tray 20 for discharging safety enhancement substance. A hazard response team, for example, a fire rescue team, can connect a fire hose to the port 22 to provide water to the tray 20.

In the illustrative embodiment, the outlet 76 may be arranged, for example, sized and/or positioned, to achieve different levels of substance within the tray 20 under different pressures at the inlet 75. The outlet 76 may be formed to discharge the substance from the tray 20 at a rate suitable to maintain the level of the substance in the tray 20 at about a first level 78 when the pressure of the substance from the inlet 75 is at about a first pressure, and to discharge the substance from the tray 20 at a rate suitable to maintain the level of the substance in the tray 20 at about a second level 80, higher than the first level 78 when the pressure of the substance from the inlet 75 is at about a second pressure. In the illustrative embodiment, the auxiliary terminals 40a, 40b may be arranged above the first level 78 but below the second level 80 such that they are short circuited only under the second pressure of substance. Under the first pressure of substance, the substance can flow through the tray 20 to provide cooling to the battery packs 38 without shorting the voltage. A hazard response team, for example, a fire rescue team connecting a fire hose to the port 22 can adjust the pressure of the water injected to meet the operational need. Flushing the substance through the tray 20 can assist with removing gaseous and/or heat.

As shown in FIG. 10, the flow control system 74 may include a valve 82 for controlling the rate of discharge from the tray 20. The valve 82 may be positioned downstream of the outlet 76 and can be operated between first and second positions to adjust the rate of discharge to selectively achieve the first and second levels 78,80 without requiring alteration of the inlet pressure. The valve 82 may be connected to a controller 84, such as a manual device (e.g., lever, wheel, spring-load) and/or electronic controller (e.g., processor) for providing the desired position of the valve 82. In some embodiments, the valve 82 may be used together with the arrangement of the outlet 76 to govern flow control, may be arranged upstream of the inlet 75 to govern flow of the substance upstream of the tray 20, and/or may have any suitable arrangement for governing flow.

Figure 11:
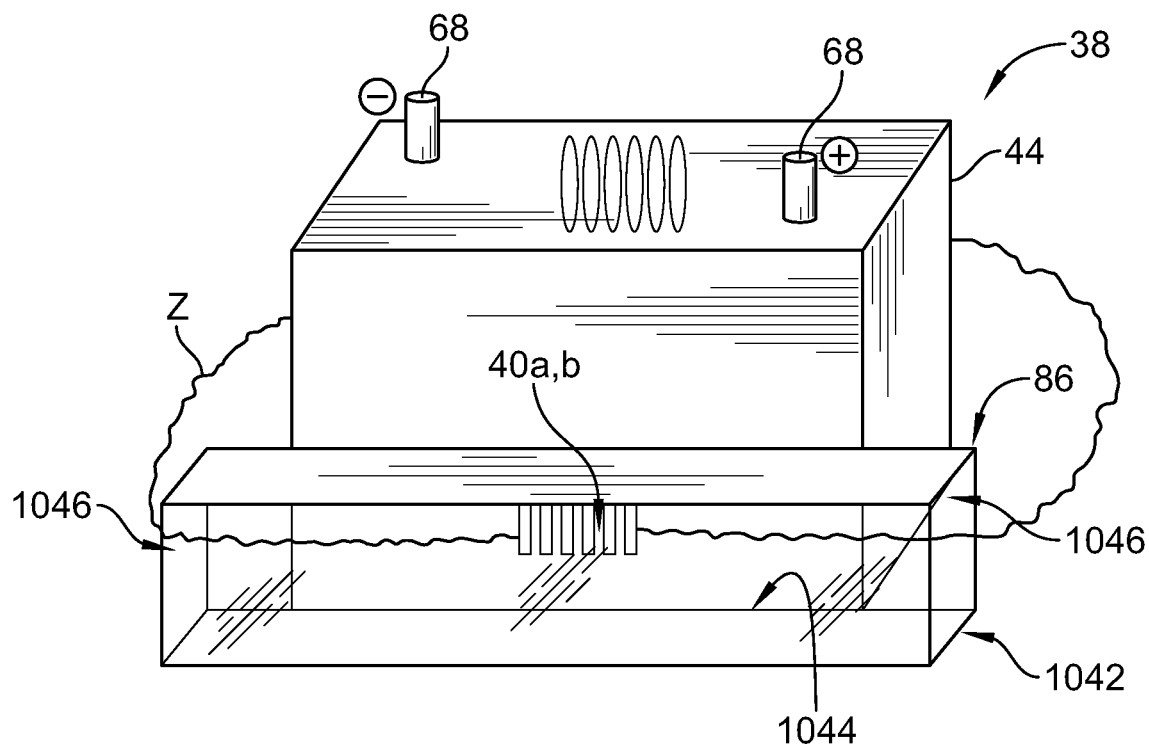
FIG. 11 is a perspective view of the battery pack unit of FIG. 9 showing a lower cover that shields the plurality of auxiliary terminals and extends over a lower portion of the housing and showing that the lower cover defines a lower channel for receiving safety enhancement substance for contact with the plurality of auxiliary terminals and showing an optional other pluralitys of auxiliary terminals arranged on an opposite side of the pack housing.

As shown in FIG. 11, another embodiment of a cover 1042 for shielding the auxiliary terminals 40a, 40b is shown. The cover 1042 is formed as a duct of non-conductive material having a channel 1044 defined therein for receiving safety enhancement substance for contact with the auxiliary terminals 40a, 40b. The cover 1042 may include openings 1046 disposed on opposite ends for passing substance through the channel 1044. The opening 1046 may be formed within a grid or mesh.

The cover 1042 can assist in defining the course of the conductive path through the safety enhancement substance which can be formed between the auxiliary terminals 40a, 40b. For example, as shown in FIG. 11, safety enhancement substance flows through the channels 1044 to contact each of the terminals 40a, 40b. The conductive path Z between auxiliary terminals 40a, 40b passes out of the channel 1044 through openings 1046. Continuing from the earlier example of water as the safety enhancement substance, the length of the path Z increases the resistance through the water which decreases the generation of gases. By directing the conductive path Z to create higher electrical resistance, hazards of gas accumulation can be reduced.

Figure 12:
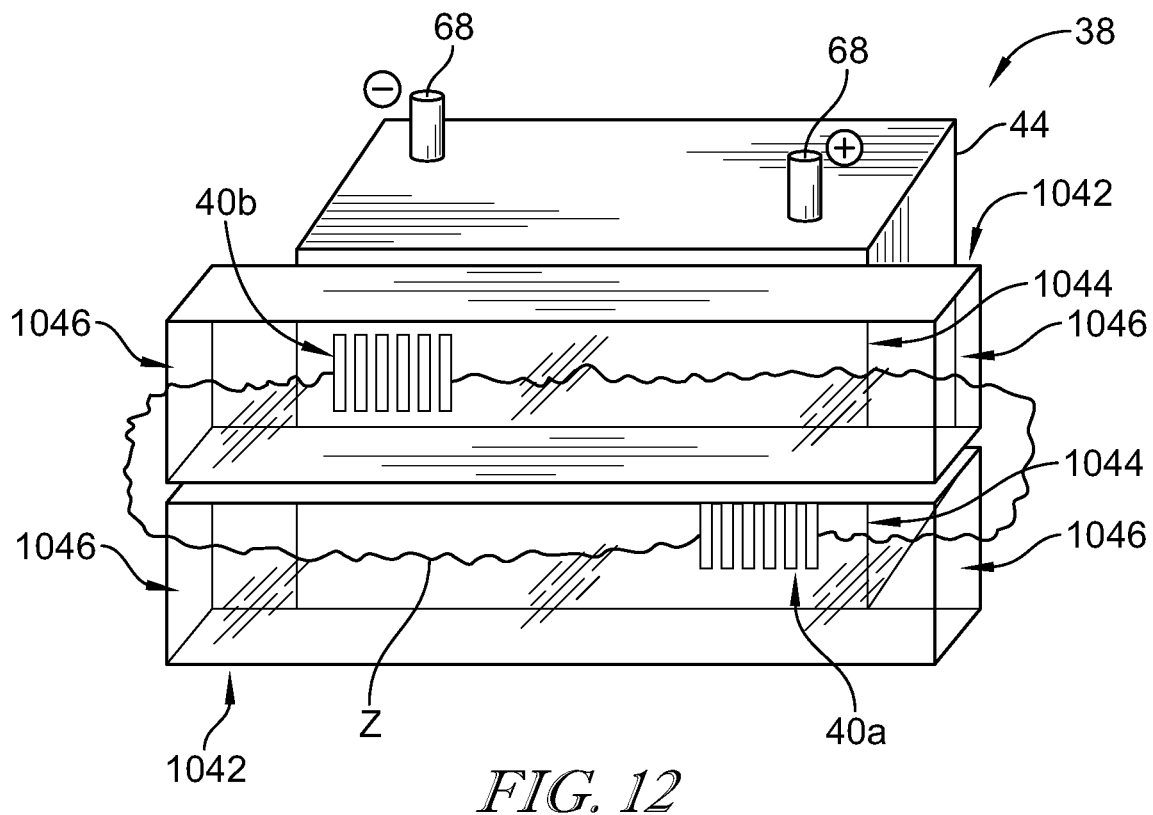
FIG. 12 is a perspective view of another embodiment of the battery pack unit of FIG. 11 showing an upper cover that shields another plurality of auxiliary terminals and extends over an upper portion of the housing above the lower cover and showing that the upper cover defines an upper channel for receiving safety enhancement substance for contact with the other plurality of auxiliary terminals, and showing that the pluralitys of auxiliary terminals are arranged near opposite ends of the pack housing.

As shown in the embodiment of FIG. 12, auxiliary terminals 40a, 40b are disposed on the same side of the housing 44. A cover 1042 may be disposed about each of the auxiliary terminals 40a, 40b. The conductive path Z is established through the openings 1046 of each duct 1042. The conductive path Z extends longitudinally along the channels 1044 through the substance for continuity between the auxiliary terminals 40a, 40b.

Figure 13:
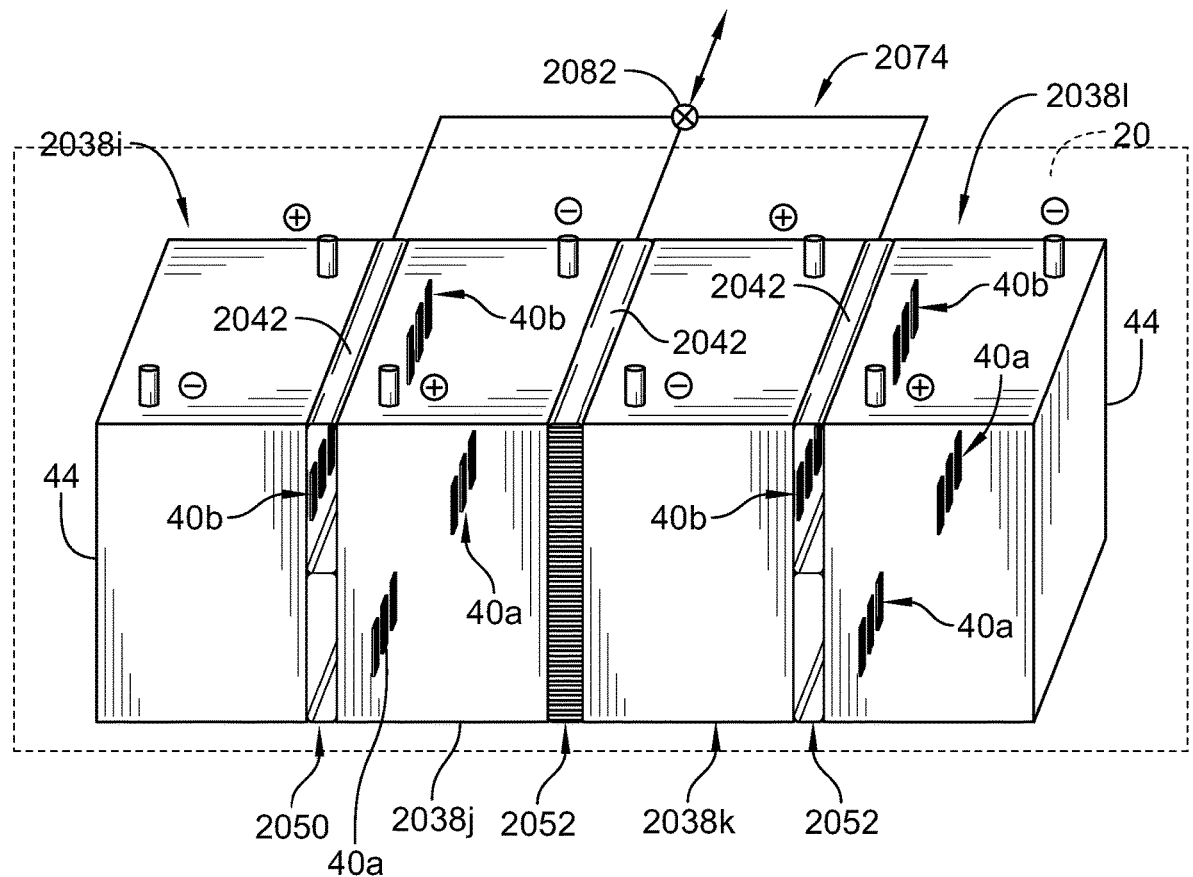
FIG. 13 is a perspective view of the battery pack unit of FIG. 11 installed in series with other battery pack units showing that a gap is formed between each adjacent battery pack unit including shorting channels (leftmost and rightmost gaps) in which the auxiliary terminals of the adjacent battery pack units are arranged for contact with the safety enhancement substance, and a cooling channel (center gap) in which heat is transferred from the battery pack units to the safety enhancement substance and in which no auxiliary terminals are arranged.

As shown in FIG. 13, another illustrative embodiment of a power system 2018. The power system 2018 is similar to the power system 18 and the disclosure of power system 18 applies equally to the power system 2018 except in instances of conflict with the disclosure of power system 2018. Power system 2018 includes the tray 20 having power packs 2038 arranged therein. The power packs 2038 are electrically connected in series with each other.

The power packs 2038 include power packs 2038i, 2038j, 2038k, 2038l as shown in FIG. 13. Adjacent power packs 2038 may define a gap 2050, 2052 therebetween. Auxiliary terminals 40a, 40b are arranged in the shorting gaps 2050 of the left and right-most power packs 2038, and the cooling gap 2052 is formed between the center power packs 2038 for flowing safety enhancement substance to remove heat from the power system 2018. The cooling gap 2052 may be fluidly isolated from the shorting gaps 2050 such that passing substance through the cooling gap 2052 does not contact the auxiliary terminals. Some cooling may be simultaneously achieved by the substance passing through the shorting gaps 2050.

The power packs 2038 may each include auxiliary terminals 40a, 40b arranged on the same side of the respective housing 44, one arranged lower 40a with negative polarity and one arranged higher 40b with positive polarity. Adjacent power packs 2038 may have corresponding arrangement of their auxiliary terminals 40a, 40b such that auxiliary terminals 40a, 40b of common polarity are adjacent to each other within the gap 2050 (i.e., have corresponding upper or lower arrangement in the orientation of FIG. 13). Accordingly, each auxiliary terminal 40a, 40b may be arranged within the corresponding channel 2044 of the cover 2042 in which auxiliary terminals 40a, 40b of the same polarity of an adjacent power pack 2038 is arranged as discussed in additional detail below.

As shown in FIG. 13, a flow control system 2074 may include a flow control device, embodied as a valve 2082, arranged to govern the flow of substance through the tray 20. In the illustrative embodiment, the valve 2082 is a multi-way valve flow valve arranged to selectively direct substance to the gaps. The valve 2082 may be disposed upstream of the tray 20 as an inlet valve. The valve 2082 may be selectively positionable between a cooling position to direct substance only to the cooling gap 2052, a shorting position to direct substance only to the shorting gaps 2050, and a combination position to direct substance to each of the cooling gap 2052 and the shorting gaps 2050. The position of the valve 2082 may be determined on the basis of the incoming pressure of the substance, such that at a cooling pressure, the cooling position is set, at a shorting pressure, the shorting pressure is set, and at a combination pressure, the combination pressure is set. In some embodiments, the desired position of the valve 2082 may be determined and executed by any suitable manner, for example, by manual adjustment and/or electronic controller using sensors. The mode (cooling, shorting, combination) of the flow control system 2074 can be set based on the operational needs of the power system 2018.

Figure 14:
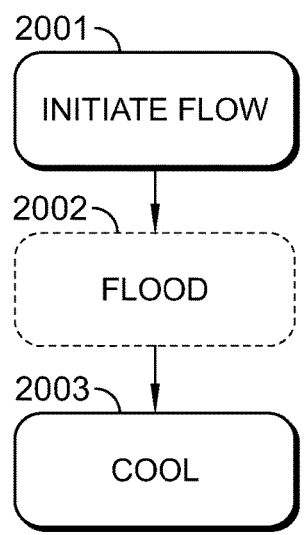
FIG. 14 is a process flow diagram of a method of executing a safety operation of the electric power system.

In an exemplary scenario, a damaged and/or malfunctioning power system 2018 may be encountered in which hazards are suspected. A user may initially inject substance into the tray 20 at the shorting or combination pressure for a period, to short circuit the auxiliary terminals 40a, 40b, followed by the cooling pressure for a period to continue cooling without continuing the short circuiting. As shown in FIG. 14, a process flow diagram may include in box 2001 initiating a flow of substance into the tray 20. Optionally, in box 2002, the power packs 2038 may be flooded to short circuit across all auxiliary terminals 40a, 40b. Such flooding may include the shorting mode or combination mode of the flow control system 2074. In box 2003, the power packs may be cooled to reduce excessive heat. Such cooling may include the cooling and/or combination mode of the flow control system 2074.

In some embodiments, the shorting mode and/or flooding of the tray 20 may include a minor shorting operation in which only auxiliary terminals 40a, 40b of common polarity are short circuited. In some embodiments, the shorting mode and/or flooding of the tray 20 may include a major shorting operation in which auxiliary terminals 40a, 40b of opposite polarity are shorted. Either of minor or major shorting operations may be applied simultaneously with the cooling mode as the combination mode and/or as an additional mode. Minor or major shorting operations may be achieved according to additional minor or major positions of the valve 2082 and/or inlet pressures.

Figure 15:
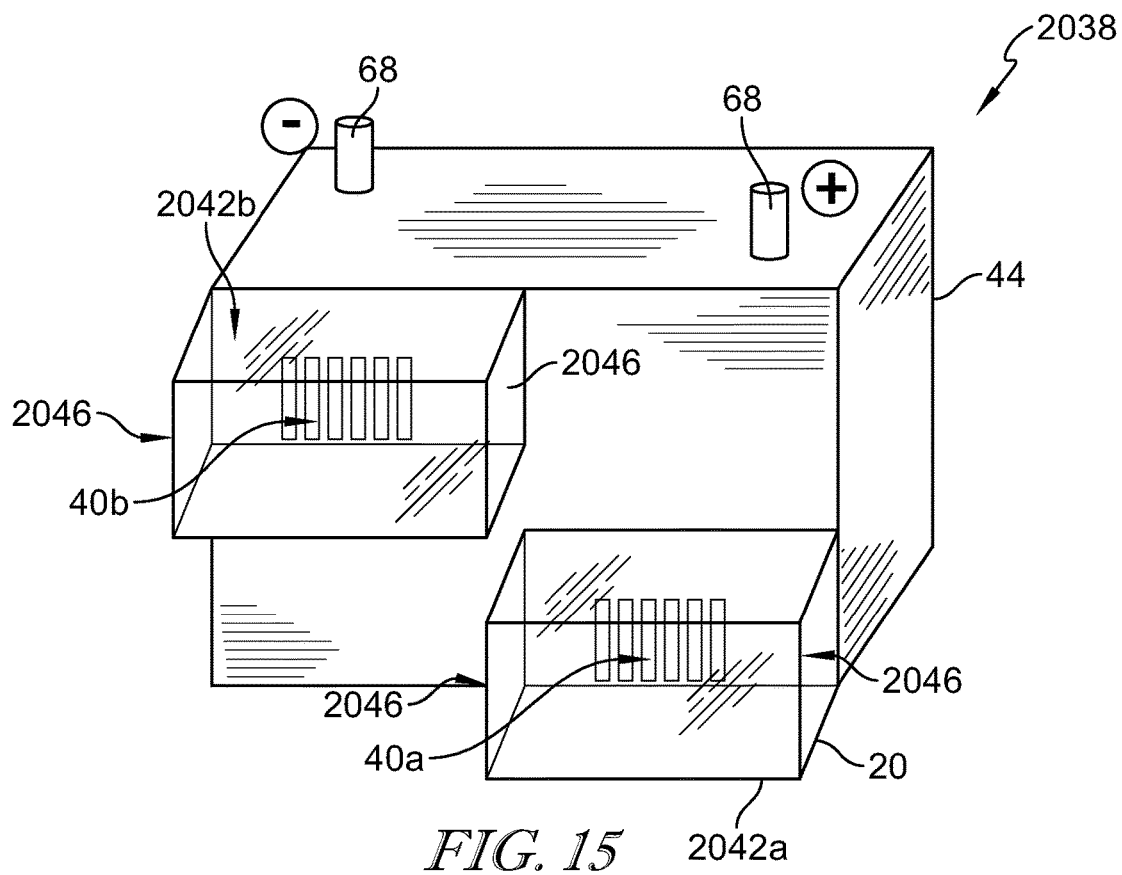
FIG. 15 is a perspective view of another embodiment of the battery pack unit of FIG. 12 including upper and lower channels which extend only partially along the lateral width of the housing of the battery pack unit.
Figure 16:
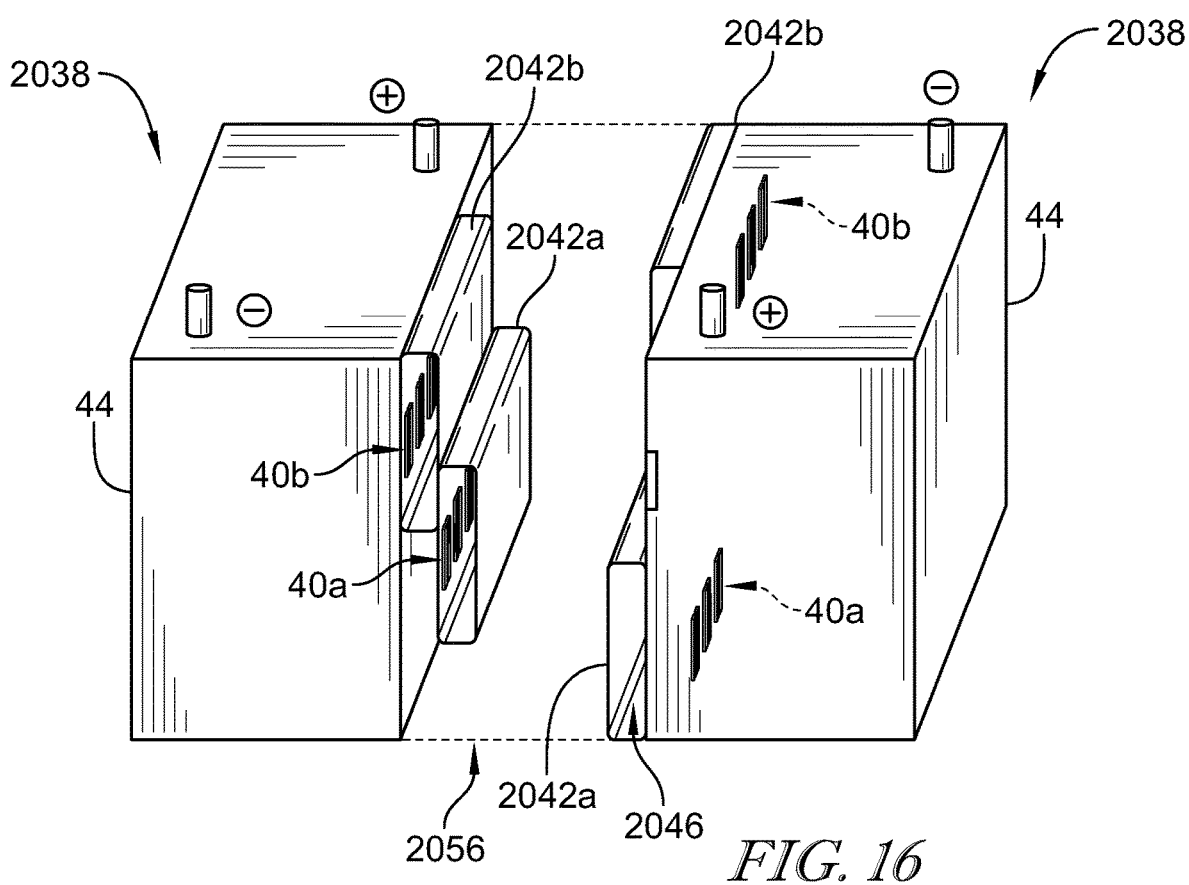
FIG. 16 is a perspective exploded view of the battery pack unit of FIG. 15 arranged in exploded association with an adjacent and complimentary battery pack unit having corresponding upper and lower channels.

As shown in FIG. 15, a power pack 2038 is shown including cover portions 2042a, 2042b arranged to shield respective auxiliary terminals 40a, 40b. The cover portions 2042a, 2042b of each adjacent power pack 2038 may be arranged diagonally opposite of each other with the respective auxiliary terminals 40a, 40b disposed therein. In the illustrative embodiment, the cover portions 2042a, 2042b respectively form the covers 2042 with a corresponding (upper or lower) cover portion 2042a, 2042b of the adjacent power pack 2038. The covers 2042 direct the conductivity path Z through the openings 2046 to increase the path length for additional electrical resistance. In FIG. 16, the adjacent power packs 2038 are shown separated to illustrate the corresponding cover portions 2042a, 2042b.

Referring to FIGS. 17 and 18, another embodiment of power packs 3038 includes auxiliary terminals 40a, 40b disposed on opposite sides of the housing 44. Covers 3042 shield the respective auxiliary terminals but do not cover the entire vertical height of the housing 44. Such an arrangement may increase the flow rate through the channels 3044 and/or create limited surface area contact between the channel 3044 and the housing 44.

Figure 21:
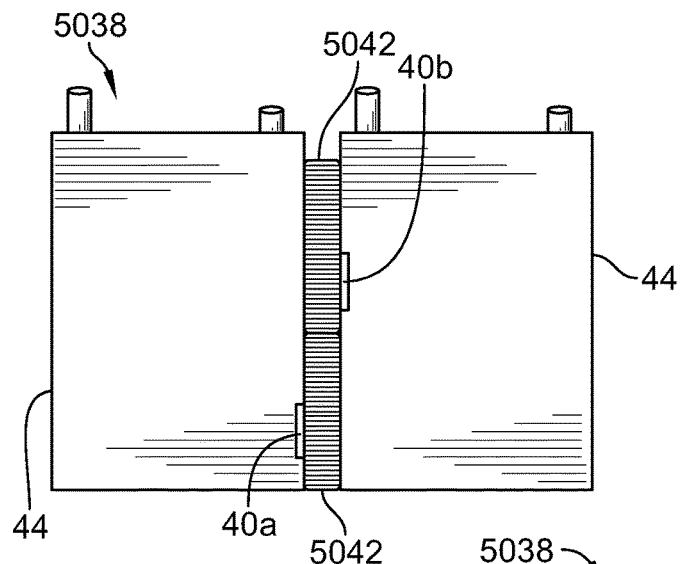
FIG. 21 is an elevation view of another embodiment of adjacent battery pack units of FIG. 19 having single chambers arranged on complimentary sides.
Figure 22:
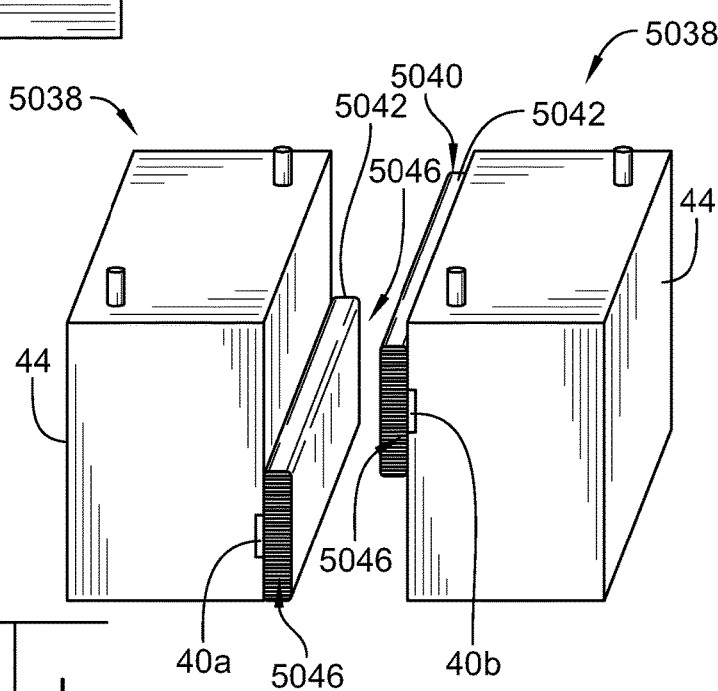
FIG. 22 is an exploded perspective view of the adjacent battery pack units of FIG. 21.

Referring to FIGS. 19 and 20, another embodiment of power packs 4038 includes covers 4042 having openings 4046 through which the conductive path Z can be established through the substance. The covers 4042 may include greater contact surface (height) with the housing 44. In FIGS. 21 and 22, another embodiment of power packs 5038 is shown in which each power pack includes only one plurality of auxiliary terminals 40a, 40b arranged on adjacent sides of the adjacent housings 44. Covers 5042 direct the conductive path Z through the openings 5046.

Power packs 2038, 3038, 4048 are generally regarded as similar to power packs 38 and the disclosure of power packs 38 applies equally to power packs 2038, 3038, 4048 unless in conflict with the specific description of power packs 2038, 3038, 4048.

Figure 23:
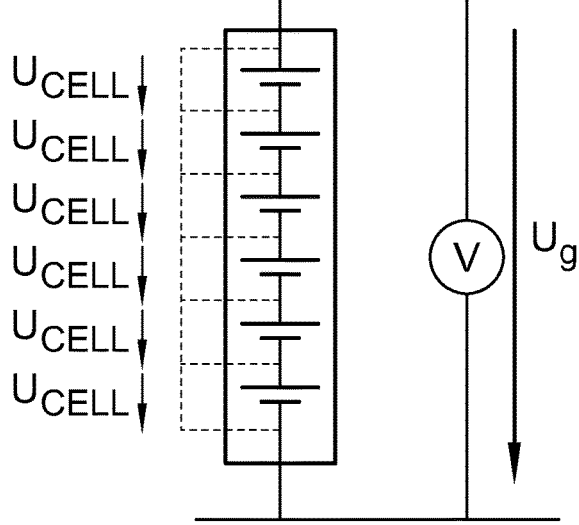
FIG. 23 is a voltage diagram of a battery pack unit of the present disclosure.

As shown in FIG. 23, an exemplary voltage diagram illustrates that a total serial voltage of a power pack $U_g$ as the sum total of the voltage of the power cells. During short circuiting across the auxiliary terminals 40a, 40b, the voltage can be reduced to the voltage level of an individual cell $U_{cell}$.

The disclosed embodiments are directed to the technical problems resulting from fires in electric vehicles that may have been started due to the existence of cathode material like NMC (Nickel-Manganese-Cobalt Oxide) or NCA (Nickel-Cobalt-Aluminum Oxide) but also by other cathode materials like Lithium-Iron-Phosphate (LFP). The difference between those materials is that NCA and NMC decompose with cell temperatures of 150-250° C. (300-490 F) and can emit pure oxygen. However, these battery cells use the same highly flammable electrolyte, which lead to a heavy fire. NCA and NMC can enhance the fire by emitting oxygen stronger than LFP.

In such fires, battery cells can be disposed in a battery module and the battery modules can be bound in a battery tray. Moreover, in electric vehicle designs, it may be difficult or impossible for personnel, such as firefighters, to have access to the battery cell for cooling and extinguish the flames. Moreover, a live battery pack with several hundreds of volt can be very dangerous for the firefighter.

A concerning scenario may arise when occupants are still in the car, while some cells and the car are burning but the battery pack is still 'alive' and has still several hundreds of volt. A hazard exists for the firefighter to save the passengers without harm to him or herself.

The present disclosure is directed to providing technical solutions for such conventional problems and includes improvements to reduce the hazard including the hydrogen generation during flooding the battery tray. The present disclosure includes Modules for Emergency Flooding (MEF) designed for making a short-circuit to lower the car battery voltage if the firefighter has to cool or to flood the battery tray. Extra terminals at the side of the module housing make it easier to short-circuit the module but also to drain the battery tray more safely because no water remains on the top terminals of the module. In some embodiments, the top (main) terminals may be protected from contact with the water.

Unlike gasoline and diesel, electric power for vehicles be handled by merely covering an fire source in fire extinguishing foam because of the internally generated oxygen and the presence of a high voltage from the battery. After an auto-collision, an electric vehicle can ignite itself even after long periods of time, for example, weeks. Such damaged battery cells can be unpredictable. The MEF of the present disclosure can improve the safety during cooling and/or flooding the battery with water, while making it is easier to drain the water from the side terminals. For example, designs within the present disclosure include covers and side (aux) terminals, which can allow the extinguishing agent to flood the battery tray quickly. Rescue workers, such as firefighters, often do not have electrical and/or chemical expertise to manage the various risks of such scenarios.

The MEF of the present disclosure may include extra positive and negative terminals, which may be located at the side of the module housing. The extra terminals may be made of stainless steel and may be protected by a cover like a grid or mesh, that human cannot tough it accidently but extinguishing agent can get through. The protecting cover may also function as a spacer that extinguishing agent can be easier access and run through the battery tray. For example, the cover can have vertical slits. The extra terminals may be locate on the same side or on any other side of the module housing.

High voltage and water is often avoided for its potential for a large reaction. However, a high voltage from a home outlet has always 110 or 240 volts is not necessarily effectively reduced by short circuit, because the voltage comes from a single source, a huge generator. However, high voltage from a battery as a number of serially connected small battery cells, of a single cell voltage of 3.6 or 3.7 V (nominal) to a higher voltage (100 cells serial connected delivers 370 V) or battery cell are preassembled in smaller units like battery modules. Modules may have a module voltage between 20 and 50 V.

If the substance (e.g, water) runs quickly into the battery tray, the water will quickly short circuit the cells or modules and the high voltage collapses to a less hazardous voltage range, for example, to the module level (20 to 50 V). The MEF can promote the speed of the substance running through the battery tray. Reaction between the water and the voltage can produce hydrogen. The amount of generated hydrogen is related to the conductivity (e.g., salt content) of the water and the distance between the positive and negative terminal of the cell or module. If the terminals far apart and/or the water is soft, less hydrogen will be generated.

If the extra (aux) terminals are closer together on one side of the module housing, the MEFs may enable lowering of the module voltage faster and safer that existing modules. Close terminals may produce more hydrogen, which can be flushed out of the tray by the water. However, after reducing the hazard and rescuing the passengers the water can drain more slowly from the tray, for example, when the pressurized source of water is removed. The present disclosure includes vertically oriented positioning of extra (aux) terminals which allows run off of the water more easily than top mounted terminals.

Even with hydrogen production, the advantages of shorting and/or cooling the battery can reduce hazard. Extinguishing fires and cooling the cells or modules; or simultaneously extinguishing, cooling, and short-circuiting the cells or modules can provide a temporarily protection to rescue the passengers and protect the firefighters against the high voltage and flames. The extra (aux) terminals for positive and negative can be located on the same side of the module housing or on two different sides. The aux terminals may be conductive surfaces like metal, carbon or graphite. Those terminals may be connected via an extra wire to the battery cell (main) terminals. The substance (water) injected to short circuit the single cells over the extra (aux) terminals, effectively connects the cells in parallel, lowering the output voltage.

The present disclosure includes concepts to make sure the water can short-circuit the extra (aux) terminals at all times and at all orientations of the car (e.g., car is flipped on its roof or leans halfway in a trench) the extra terminals may be connected to water channels. Those channels may transport the water always and precise to the extra terminals. Additionally these channels can provide a protection cover protect the extra terminals against touching. Like the extra terminals, the water channel can be placed on the same side or on opposite sides.

The present disclosure includes various operation modes for power systems including flooding, cooling and combination modes. In a Flood Mode: a fire hose may be connected onto a battery tray; a certain amount of pressure may open a valve, for example, the water pressure pushes against a disk with a rubber sealing and overcomes the force of a spring to open the valve. For the flood mode and for the first response, the fire fighters may use the maximum water pressure they have. The battery tray can be protected by a pressure-reducing regulator to limit the maximum pressure. Depending of the construction of the battery tray, the modules can be equipped with channels for the extra terminals and additionally with extra cooling channels as well. The flood mode can include that all channels (water/short channels and cooling channels) are filled with extinguishing agent and excess agent may run out of the drainage. The cooling channels may be separate from the water/short channels with a two-step pressure valve or simply a second valve with higher force to open it. The battery cells or modules can receive cooling and can be short-circuit at the same time to rescue the passengers. The flood mode, including water channels and cooling channels, can provide effective cooling.

In a Cooling Mode: depending on the battery tray, the cooling could be the first measure without short-circuiting the modules. In that case, the force to open the "cooling channel" valve may be lower than for the water channels. A lower pressure of the extinguishing agent can reduces the amount of extinguishing agent per minute and the liquid level in the battery tray. The cell or modules may receive cooling but may not be short-circuited. The cooling mode can be used if the damage of the car is less significant and/or as precaution to avoid a possible thermal runway inside the battery tray.

In a Combo Mode: the combo mode may combines the flooding and the cooling mode. In some embodiments, to rescue passengers, the firefighter may starts with the flooding mode and/or combo mode, and may shift later to the cooling mode once an initial threat appears avoided.

Within the present disclosure, the location, sizes, and orientation of the channels can have multiple variations. For example: one module may have only half of the channels and only in combination with another module it will create the water channels. In some embodiments, only the terminals of common polarity will be short-circuited.

The Module for Emergency Flooding (MEF) may have minimum two extra terminal for the negative and positive pole. The Module for Emergency Flooding may have at least one extra terminal per cell on the cathode and/or anode. The extra terminals may connect to the internal battery cells. The extra terminals may be located at the same side of the module housing or on different sides. The position of the extra terminals may be physically lower than the main terminals to avoid a wetting or flooding of the main terminals. The extra terminals may have vertical orientation.

The MEF may have at least one protection cover for every extra (aux) terminal to protect the terminals and make space for an easier flooding of the battery tray. The surface of the terminals may be formed of electrical conductive materials like metal, stainless steel, carbon or graphite, preferred is stainless steel. The extra terminals may have the shape of rectangle, circular, triangle or trapezoid.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. An electrical vehicle for operation on roadways, the vehicle comprising:

a vehicle base including a chassis, a drive train coupled to the chassis to drive the chassis along roadways, and an electric power control means connected to the drive train to control provision of motive power, configured to receive insertion of safety enhancement fluid arranged to provide electrical connection shorting across electrical terminals of a vehicle power pack, wherein the electric power control means includes a tray defining a cavity, the power pack arranged within the cavity and having a pair of main terminals of opposite polarity, wherein the vehicle power pack includes at least two power cells electrically connected in series and each having a plurality of auxiliary terminals arranged in fluid communication with each other to achieve electrical connection for shorting in response to at least partial filling of the tray with safety enhancement substance, wherein the tray includes an inlet for receiving safety enhancement substance into the cavity, further comprising a flow control system including a flow controller for governing the flow of safety enhancement substance through the tray, wherein the flow control system includes at least one outlet for discharging safety enhancement substance from the cavity and the at least one outlet is configured to discharge safety enhancement fluid from the cavity such that at a first inlet rate of safety enhancement substance the cavity maintains a cooling level of safety enhancement substance to electrically connect the auxiliary terminals without shorting the main terminals and at a second inlet rate of safety enhancement substance, greater than the first inlet rate, the cavity maintains a flooding level of safety enhancement fluid which shorts the main terminals.

2. The electrical vehicle of claim 1, wherein the auxiliary terminals have common polarity with each other.

3. The electrical vehicle of claim 2, wherein each auxiliary terminal is electrically connected to different ones of the at least two power cells.

4. The electrical vehicle of claim 3, wherein the plurality of auxiliary terminals form a first plurality of auxiliary terminals having common polarity and the power pack includes a second plurality of auxiliary terminals each having polarity different from the first plurality.

5. The electrical vehicle of claim 1, wherein the flow control system includes an outlet for discharging safety enhancement substance from the cavity and the flow controller is operable between a cooling mode in which the safety enhancement substance flows only through a cooling path and a short mode in which the safety enhancement substance flows in contact with the auxiliary terminals.

6. The electrical vehicle of claim 5, wherein the short mode is a minor short mode in which the safety enhancement substance flows in contact with the auxiliary terminals of the same polarity.

7. The electrical vehicle of claim 5, wherein the short mode is a major short mode in which the safety enhancement substance flows in contact with auxiliary terminals having opposite polarity.

8. The electrical vehicle of claim 7, wherein the short mode is a minor short mode in which the safety enhancement substance flows in contact with the auxiliary terminals of the same polarity.

9. The electrical vehicle of claim 1, wherein the electric power control means includes at least one cover arranged to shield the auxiliary terminals and having at least one inlet section configured to allow ingress of the safety enhancement substance for contact with the auxiliary terminals.

10. The electrical vehicle of claim 9, wherein the safety enhancement substance is water.

11. The electrical vehicle of claim 9, wherein the at least one cover defines a channel.

12. The electrical vehicle of claim 11, wherein the auxiliary terminals includes a first plurality of auxiliary terminals and a second group of auxiliary terminals and the at least one cover defines another channel and the first plurality is arranged within the channel and the second plurality is arranged within the another channel.

13. The electrical vehicle of claim 12, wherein the power pack includes a pack housing and the auxiliary terminals are arranged on an outer portion of the pack housing.

14. The electrical vehicle of claim 13, wherein the power pack is a first power pack and the electric power system includes a second power pack having at least two power cells disposed within a pack housing and connected to a plurality of auxiliary terminals, the first and second power packs arranged adjacent to each other and defining a fluid gap therebetween.

15. The electrical vehicle of claim 13, wherein the fluid gap forms a cooling channel for receiving safety enhancement fluid therein to extract heat.

16. The electrical vehicle of claim 14, wherein the auxiliary terminals of at least one of the first and second power packs is arranged within the fluid gap in fluid communication with each other within the tray to achieve electrical connection upon at least partial filling of the tray with the safety enhancement substance.

17. The electrical vehicle of claim 14, wherein the auxiliary terminals of at least one of the first and second power packs is arranged on a side of the corresponding pack housing outside of the fluid gap.

18. An electric power system for providing motive power to an electrical vehicle having a chassis and a power train arranged to drive the chassis along roadways, the electric power system comprising:

a tray defining a cavity, and a power pack arranged within the cavity, the power pack including a pair of main terminals of opposite polarity, at least two power cells electrically connected in series, and a plurality of auxiliary terminals connected to the at least two power cells and arranged in fluid communication with each other within the tray to receive insertion of safety enhancement fluid arranged providing electrical connection shorting across at least two of the plurality of auxiliary terminals with at least partial filling of the tray with the safety enhancement substance;

wherein the tray includes an inlet for receiving safety enhancement substance into the cavity;

further comprising a flow control system including a flow controller for governing the flow of safety enhancement substance through the tray;

wherein the flow control system includes at least one outlet for discharging safety enhancement substance from the cavity and the at least one outlet is configured to discharge safety enhancement fluid from the cavity such that at a first inlet rate of safety enhancement substance the cavity maintains a cooling level of safety enhancement substance to electrically connect the auxiliary terminals without shorting the main terminals and at a second inlet rate of safety enhancement substance, greater than the first inlet rate, the cavity maintains a flooding level of safety enhancement fluid which shorts the main terminals.

* * * * *